(12) United States Patent
Sulchek et al.

(10) Patent No.: US 8,356,714 B2
(45) Date of Patent: Jan. 22, 2013

(54) MICROFLUIDIC DEVICE FOR SEPARATION OF PARTICLES

(75) Inventors: Todd A. Sulchek, Atlanta, GA (US); Alexander Alexeev, Atlanta, GA (US); Gonghao Wang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 237 days.

(21) Appl. No.: 12/792,462

(22) Filed: Jun. 2, 2010

(65) Prior Publication Data

US 2010/0300942 A1 Dec. 2, 2010

Related U.S. Application Data

(60) Provisional application No. 61/183,297, filed on Jun. 2, 2009.

(51) Int. Cl.
*A01F 12/44* (2006.01)
(52) U.S. Cl. .................... 209/132; 209/155; 210/433.1; 210/650
(58) Field of Classification Search .................. 209/132, 209/155
See application file for complete search history.

(56) References Cited

U.S. PATENT DOCUMENTS

| | | |
|---|---|---|
| 4,100,068 A | 7/1978 | Jordan et al. |
| 4,935,634 A | 6/1990 | Hansma et al. |
| 5,215,926 A | 6/1993 | Etchells, III et al. |
| 5,240,856 A | 8/1993 | Goffe et al. |
| RE34,489 E | 12/1993 | Hansma et al. |
| 5,291,775 A | 3/1994 | Gamble et al. |
| 5,486,457 A | 1/1996 | Butler et al. |
| 5,750,989 A | 5/1998 | Lindsay et al. |
| 5,939,319 A | 8/1999 | Hlavinka et al. |
| 6,043,066 A | 3/2000 | Mangano et al. |
| 6,454,924 B2 | 9/2002 | Jedrzejewski et al. |
| 6,478,969 B2 | 11/2002 | Brantley et al. |
| 6,544,423 B1 * | 4/2003 | Baurmeister et al. ......... 210/650 |
| 6,592,821 B1 * | 7/2003 | Wada et al. .................. 422/68.1 |
| 6,595,232 B2 | 7/2003 | Guzman et al. |
| 6,631,648 B2 | 10/2003 | Lai et al. |
| 7,763,453 B2 * | 7/2010 | Clemmens et al. ........ 435/286.7 |
| 2005/0121615 A1 | 6/2005 | Prater et al. |
| 2006/0118479 A1 * | 6/2006 | Shevkoplyas et al. ..... 210/433.1 |

* cited by examiner

*Primary Examiner* — Terrell Matthews
(74) *Attorney, Agent, or Firm* — Bryan W. Bockhop; Bockhop & Associates, LLC

(57) ABSTRACT

An apparatus for separating particles includes a first planar wall and a spaced apart second planar wall parallel to the first planar wall. The first planar wall and the second planar wall define a passage therebetween, which is disposed along a fluid flow axis. A first plurality of spaced apart elongated ridges extends into the passage from the first planar wall. The first plurality of spaced apart elongated ridges is disposed along a diagonal direction relative to the fluid flow axis. When a fluid is moved through the passage in a direction corresponding to the fluid flow axis, particles of a first type will tend to move in a first direction that is diagonally away from the fluid flow axis and particles of a second type, different from the first type, will tend to move in a second direction that is different from the first direction.

5 Claims, 3 Drawing Sheets

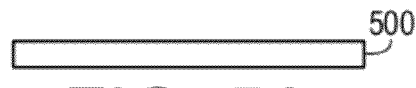
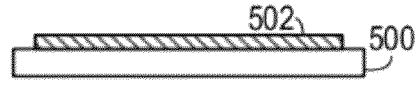
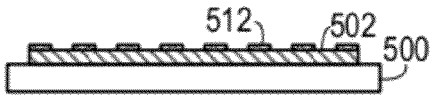
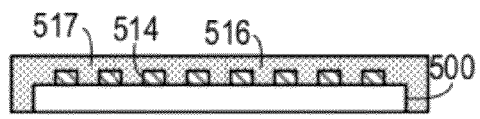
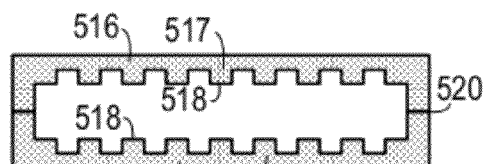
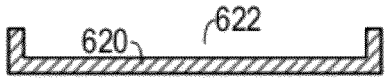
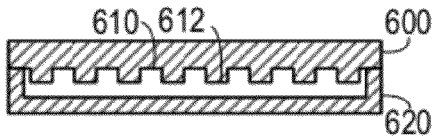

MICROFLUIDIC DEVICE FOR SEPARATION OF PARTICLES

CROSS-REFERENCE TO RELATED APPLICATION(S)

This application claims the benefit of U.S. Provisional Patent Application Ser. No. 61/183,297, filed Jun. 2, 2009, the entirety of which is hereby incorporated herein by reference.

BACKGROUND OF THE INVENTION

1. Field of the Invention

The present invention relates to microfluidic devices and, more specifically, to a microfluidic device directed to separating particles and a method for making the same.

2. Description of the Related Art

Separating certain microscale particles, such as cells and small pharmaceutical granules, based on physical parameters can be useful in diagnostic and industrial applications. For example, certain diseased cells tend to be stiffer than healthy compliant cells. Unfortunately, separating cells based on stiffness is extremely difficult. Therefore, separation of cells based on stiffness is not practical for diagnostic applications.

Therefore, there is a need for a device and method for separating particles based on stiffness and other parameters with a practical throughput.

SUMMARY OF THE INVENTION

The disadvantages of the prior art are overcome by the present invention which, in one aspect, is an apparatus for separating particles that includes a first planar wall and a spaced apart second planar wall parallel to the first planar wall. The first planar wall and the second planar wall define a passage therebetween, which is disposed along a fluid flow axis. A first plurality of spaced apart elongated ridges extends into the passage from the first planar wall. The first plurality of spaced apart elongated ridges is disposed along a diagonal direction relative to the fluid flow axis. When a fluid is moved through the passage in a direction corresponding to the fluid flow axis, particles of a first type will tend to move in a first direction that is diagonally away from the fluid flow axis and particles of a second type, different from the first type, will tend to move in a second direction that is different from the first direction.

In another aspect, the invention is a method of sorting a plurality of particles according to particle type, in which the plurality of particles are suspended in a fluid, thereby creating a particle suspension. The particle suspension is moved in a direction of a fluid flow axis through two parallel walls that define a passage therebetween. A plurality of parallel spaced apart ridges extends from each of the two parallel walls. The plurality of parallel spaced apart ridges is disposed along a direction that is diagonal to the fluid flow axis so that particles of a first type will tend to move in a first direction that is diagonally away from the fluid flow axis and particles of a second type, different from the first type, will tend to move in a second direction that is different from the first direction.

In yet another aspect, the invention is a method of making a microfluidic particle separator, in which a first plurality of ridges extending upwardly from a first plate is generated so that the ridges are diagonal to an edge of the first plate. The first plate is placed adjacent to a second plate so that the first plurality of ridges faces the second plate, thereby defining a passage therebetween. At least a portion of the first plate is sealed to at least a portion of the second plate.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 5A-5G are a series of schematic diagrams demonstrating a first method of making a microfluidic particle separator.

FIGS. 6A-6D are a series of schematic diagrams demonstrating a second method of making a microfluidic particle separator.

DETAILED DESCRIPTION OF THE INVENTION

Figure 1:
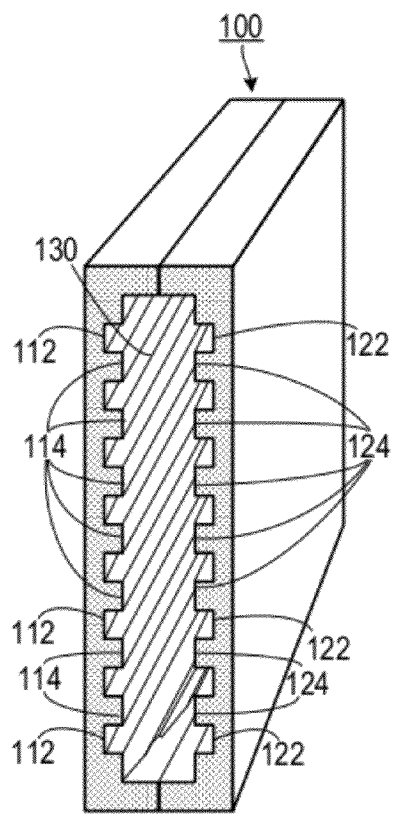
FIG. 1 is a perspective view of one embodiment of a microfluidic particle separator.
Figure 3:
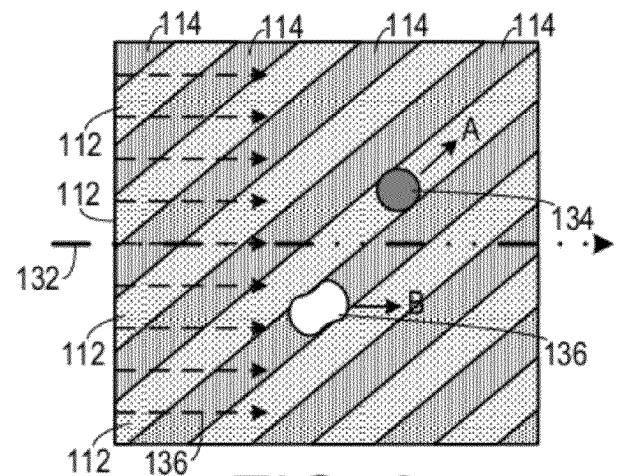
FIG. 3 is a schematic diagram demonstrating separation of particles by a microfluidic particle separator.
Figure 4:
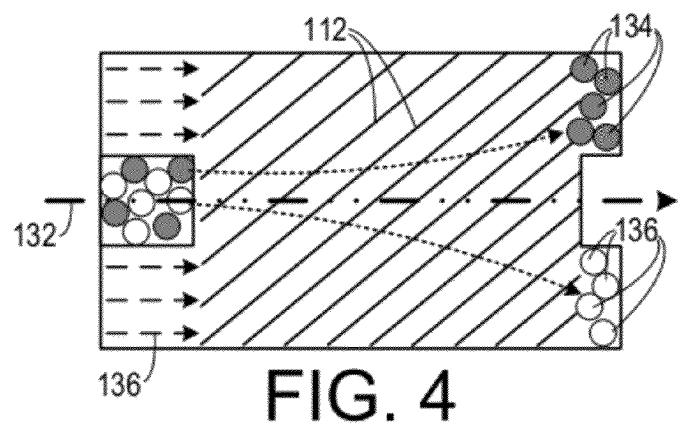
FIG. 4 is a schematic diagram demonstrating one embodiment of a microfluidic particle separator.
Figure 2:
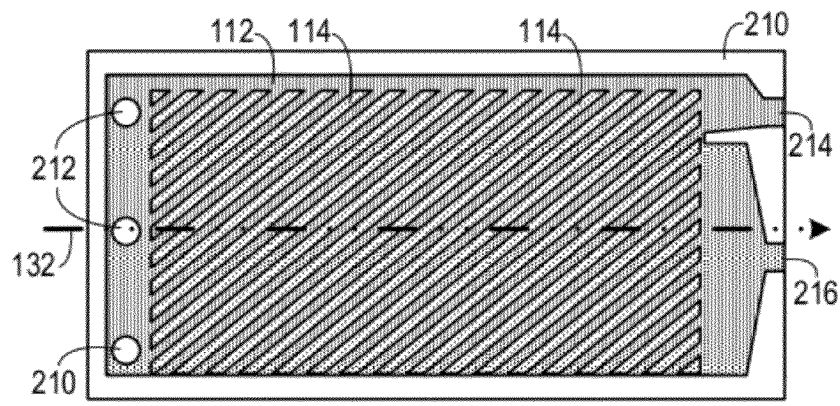
FIG. 2 is a plan view of a portion of a microfluidic particle separator.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1-4, one embodiment of an apparatus 100 for separating particles includes a first planar wall 112 and a spaced apart second planar wall 122 parallel to the first planar wall 112. The first planar wall 112 and the second planar wall 122 define a passage therebetween 130, which is disposed along a fluid flow axis 132. A first plurality of spaced apart elongated ridges 114 extends into the passage 130 from the first planar wall 112. The first plurality of spaced apart elongated ridges 114 is disposed along a diagonal direction relative to the fluid flow axis 132. A second plurality of spaced apart elongated ridges 124 extends into the passage 130 from the second planar wall 122. The second plurality of spaced apart elongated ridges 124 is also disposed along a diagonal direction relative to the fluid flow axis 132.

When a fluid 136 is moved through the passage 130 in a direction corresponding to the fluid flow axis 132, particles of a first type (such as stiff particles 134) will tend to move in a first direction (direction A) that is diagonally away from the fluid flow axis 132. Particles of a second type (such as compliant particles 136, which are particles with a stiffness less than that of the stiff particles 134) will tend to move in a second direction (direction B) that is different from the first direction. In an alternate embodiment, the particles of the first type could include particles having a first diameter and the particles of the second type could include particles having a second diameter that is less than the first diameter.

In one embodiment, the first planar wall, the second planar wall and the elongated ridges can each include a polymer, such as poly(dimethylsiloxane) (PDMS). In an alternate embodiment, the first planar wall, the second planar wall and the elongated ridges can each include a crystalline substance, such as silicon, or an amorphous substance, such as a glass.

A casing 210 typically surrounds the first planar wall 112 and the second planar wall 122 and at least one fluid inlet hole 212 will open to a first end of the passage 130. At least a first fluid outlet hole 214 and a spaced apart second fluid outlet hole 216 open to a second end of the passage 130, which is opposite from the first end. The first fluid outlet hole 214 is disposed in a region where particles of the first type are most likely to accumulate and the second fluid outlet hole 216 is disposed in a region where particles of the second type are most likely to accumulate.

As shown in FIGS. 5A-5H, in one method of making a microfluidic particle separating device, a photosensitive polymer 502, such as SU8 is spin coated onto a rigid substrate 500. A mask 512 including an image of ridges is applied to the photosensitive polymer 502 and the photosensitive polymer 502 is exposed and cured. The unexposed polymer is removed, resulting is a reverse image of the ridges 514, thereby generating a mold 515. A second polymer 516 (such as PDMS) is applied to the mold 517. Once the second polymer 516 is cured, the resulting cast 517 is removed from the mold 515. Two complimentary shaped casts 517 are placed against each other so that the ridges 518 face each other and then they are sealed using, for example, an O2 plasma seal.

As shown in FIGS. 6A-6D, in one method of making an embodiment employing only a single ridged plate, ridges 612 can be etched directly onto a rigid first plate 600 using known photolithographic methods. A trough 622 can be etched into a second plate 620 and the second plate can be disposed against the first plate 600 and the two plates can be sealed together using anionic bonding. In this embodiment, the first plate 600 and the second plate 620 can comprise a crystalline substance (e.g., silicon) or an amorphous substance (e.g., a glass).

Figure 7:
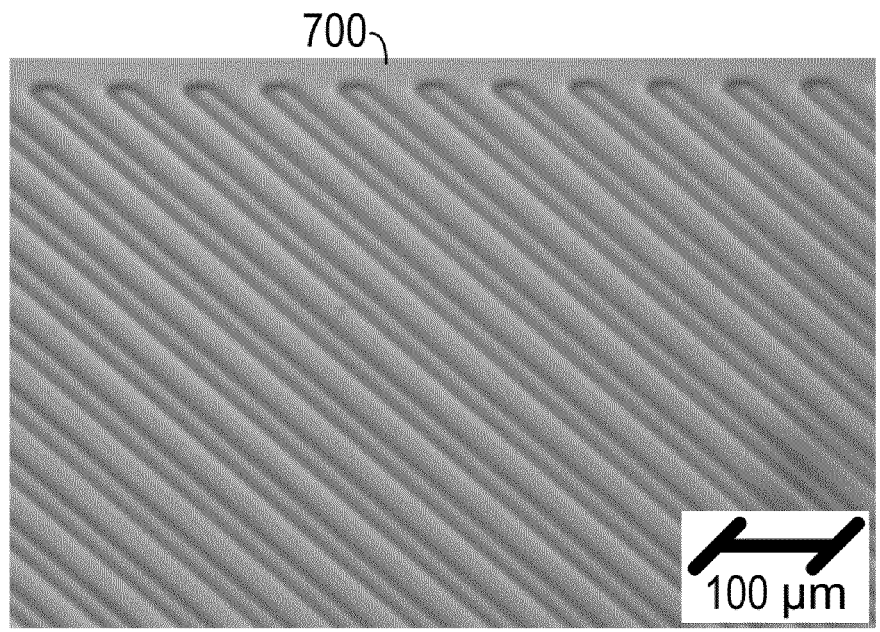
FIG. 7 is a micrograph of one surface of a microfluidic particle separator.
Figure 8:
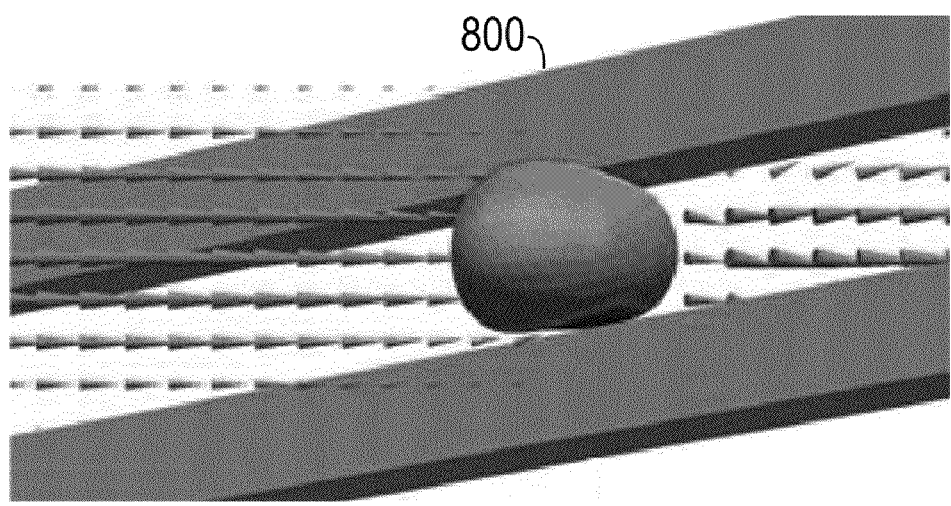
FIG. 8 is a schematic diagram showing a simulation of a particle interacting with a fluid and two ridges in a microfluidic particle separator.

A micrograph 700 of a plate with ridges made according to an embodiment disclosed above is shown in FIG. 7. An image 800 of a simulation of a particle interacting with a fluid flow and ridges is shown in FIG. 8.

One experimental embodiment is a microfluidic device capable of continuous separation and sorting of microscale elastic particles, synthetic microcapsules, and biological cells by their mechanical compliance. Movement of microscale compliant objects in microchannels with periodical constrictions demonstrate a dynamical interplay between elastic deformation due to viscous flow and the channel geometry that can be harnessed to provoke cell segregation. For example, cells with dissimilar stiffness initially having identical lateral positions disperse to distinct lateral locations in a microchannel with diagonal constrictions and, in this way, can be effectively separated by their compliance (i.e., stiffness). The microfluidic sorting devices disclosed herein could prove extremely valuable for rapid and inexpensive diagnostics of a large number of pathologies affecting the biomechanical properties of biological cells that could potentially save numerous human lives.

A three-dimensional computer simulations was used to design microfluidic channels for continuous flow separation of deformable particles. A microfluidic channel encompasses an array of diagonal ridges protruding from the opposite sidewalls. The simulation modeled compliant particles as fluid-filled elastic shells. The particles were immersed into a viscous fluid filling a microchannel with rigid, impenetrable ridges and sidewalls. The fluid was driven by an applied pressure gradient that sets the flow velocity and propels the deformable particles through the microchannel. To examine this multi-component system, a recently developed hybrid method was employed, which integrated the lattice Boltzmann model (LBM) for the fluid dynamics and the lattice spring model (LSM) for the micromechanics of solids.

The lattice Boltzmann model is a lattice-based method for simulating hydrodynamic flows. The model consists of two processes, the first being the propagation of fluid "particles" to neighboring lattice sites, and the second being collisions between particles when they reach a site. The system is characterized by a single particle velocity distribution function, $f_i(r,t) \equiv f(r,c_i,t)$, describing the mass density of fluid particles with velocity $c_i$ at a lattice node r at time t. The hydrodynamic quantities are moments of the distribution function, i.e., the mass density $$\rho = \sum_i f_i,$$

the momentum density $$j = \rho u = \sum_i c_i f_i,$$

with u being the local fluid velocity, and the momentum flux $$\prod = \sum_i c_i c_i f_i.$$

We set the fluid density to $\rho=1$ and viscosity to $\mu=\nu\rho=1/6$.

The solid, elastic material was represented by a lattice spring model (LSM), which consists of a network of harmonic springs that connect regularly spaced mass points or nodes. The elastic energy associated with a node at position $r_i$ is $$E_s(r_i) = 0.5 \sum_i k(r_{ij} - r_{ij}^{eq})^2.$$

Here, $r_{ij}=|r_i-r_j|$ is the length of the spring between two nodes with positions $r_i$ and $r_j$, $r_{ij}^{eq}$ is its equilibrium length, and k is the stretching spring constant. This results in a spring force $F_s = \delta E_s/\delta r_i$.

The particle's three-dimensional shell is constructed from two concentric layers of LSM nodes. Using the Delaunay triangulation technique, nodes were distributed in a regular manner on each surface. These two concentric surfaces are separated by a distance that is equal to the average size of a triangular bond $\Delta x_{LS}$ and are connected by springs between the nearest and next-nearest neighbour nodes. The solid density is $\rho_c = 2M/\sqrt{3}\Delta x_{LS}^3$, where M is the mass at each node, and the Young's modulus of the curved shell can be estimated as $E=5k/2\Delta x_{LS}$. In the simulations, the outside radius of the undeformed capsule is R=10 and the density is $\rho_c=1$ (unless specified otherwise, the dimensionless values are expressed in lattice Boltzmann units). The number of LSM nodes on this outer radius is $N_c=642$, the average spacing between nodes is $\Delta x_{LS} \approx 1.4$, and the thickness of the capsule's shell is $h=1.4$. To model the solid ridges in microchannel, immobile nodes arranged on a simple cubic lattice with separation distance equal to $\Delta x_{LS}=5/4$ between neighbour nodes were used.

To prevent overlap between the particle and the solid walls, a Morse potential $\phi(r)=\epsilon(1-\exp[-(r-r_0)/\kappa])^2$ were used. Here, $\epsilon$ and $\kappa=1$ characterize the respective strength and range of the interaction potential, $r$ is the distance between a pair of LSM nodes, where one node lies on the capsule's outer surface and the other lies at the wall-fluid interface, and $r_0=1.8$ is the equilibrium distance where the force due to the potential is zero. In the simulations, $\epsilon=0.005$ was fixed for the repulsive part of the potential ($r<r_0$) and $\epsilon=0$ otherwise.

To capture the dynamics of the solid material, Newton's equation of motion, $F(r_i)=M_i\delta^2 r_i/\delta t^2$ was used, using the velocity Verlet algorithm. Here, F is the total force acting on the node $r_i$ which consists of the spring force, the force due to capsule-wall interactions, and the force exerted by the fluid on the solid at the solid-fluid boundary. In respect to the latter force, appropriate boundary conditions were imposed between the LBM and LSM to couple the models. The quality of computational grid was verified by calculating flows with grid density increased by 50%, which had little effect on the capsule motion.

The simulations began with particles initially placed at the middle of the microchannel and the position of these compliant entities was tracked as they were propelled through a set of narrow constrictions. Photographs from the simulations revealed extensive distortions of initially spherical particles due to the forces imposed by viscous solvent and the interactions with the rigid ridges. What was surprising, however, was that the particles with different stiffness rapidly segregate. The particles tended to follow oscillatory trajectories as they are propelled along the microchannel. The two distinct particles vigorously migrate toward opposite sidewalls of the channel and, thereby, separate based on their mechanical stiffness. Specifically, it was found that the softer particle with $Ca=7.5\times10^{-3}$ migrates to the wall at $y=0$, whereas the stiffer particle with $Ca=5\times10^{-3}$ is repelled toward the wall at $y=W$.

The rate of lateral migration is defined by the intrinsic particle elasticity and particles with different compliance exhibit different lateral displacement rates. Thus, the information on lateral particle displacement can be directly translated into the magnitude of the particle's effective elasticity. In this manner, a microchannel with diagonal ridges can be harnessed for dynamically measuring elastic properties of compliant microparticles.

The effect of capsule elasticity is quantified by calculating the rate of particle lateral displacement per structure period, $\Delta V$. In these simulations, $\Delta V$ was measured at the second structure period to avoid the influence of the initial flow transient. Throughout the transient period, the lateral location of the particle's centre of mass was fixed while appropriate shell deformation and translation was allowed.

Where the initial particle lateral position was varied, distinct particles exhibit different $\Delta V$ for the whole range of particle positions and, therefore, follow different trajectories throughout their travel in the microchannel. $\Delta V$ is nonuniform across the channel and the velocity variation is most pronounced for stiffer particles that decelerate more when pass through the constrictions. This velocity variation may be attributed to the influence of a lift force arising near the channel sidewalls; this force pushes slowly moving particles toward the channel centre. In the middle of microchannel, the influence of sidewalls decays and the roughly constant $\Delta V$ is due to the particle interactions with the ridges.

Importantly, $\Delta V$ has different signs for particles with stiffness that lies above and below a threshold capillary number, $Ca_c$. It means that relatively soft particles with $Ca>Ca_c$ migrate toward the wall at $y=0$, whereas stiffer particles with $Ca<Ca_c$ are repelled to the opposite sidewall at $y=W$. As a result of this separation, soft and stiff particles accumulate on the opposite sides of the microchannel. For particles with $Ca=Ca_c$, the net migration rate is zero and these particles periodically oscillate near the initial lateral positions as they are propelled through the microchannel.

Because $Ca_c$ depends both on the fluid flow rate and particle elasticity, the magnitude of threshold particle stiffness can be adjusted by altering the fluid velocity. Alternatively, $Ca_c$ can be tuned by changing the constriction gap b. The threshold $Ca_c$ can be found from the condition $\Delta V=0$. As expected, $Ca_c$ decreases with increasing constriction gap b. Interestingly, softer capsules exhibit $\Delta V$ that almost independent from both Ca and b, whereas the migration rate of stiff particles increases rapidly with increasing stiffness. In fact, the stiffer particles migrate a distance of about 3.5 R during a single structure period; that brings them close to the sidewall limiting further particle migration.

The lateral displacement of compliant particles can be rationalized by examining the energy changes associated with elastic deformations of the particles. When a particle passes through one of the narrow constriction, its elastic shell undergoes stretching and bending. This process increases the system energy and, therefore, gives rise to a thermodynamic force that is proportional to the energy gradient. Directed normally to the diagonal ridges, this thermodynamic force repels the particle out of the constriction to minimize the system free energy. As a result of this natural energy minimization process, the particle trajectories diverge and particles gain net lateral displacements. The variation in elastic energy and, therefore, magnitude of the thermodynamic force is proportional the particle's mechanical stiffness and, thus, different particles attain distinct lateral locations due to the interactions with diagonal ridges. More specifically, relatively soft particles follow the fluid streamlines, while the stiff particles are repelled by the ridges toward the wall at $y=W$.

Furthermore, the local fluid velocity is altered by the diagonal ridges in the microchannel. In the vicinity of a constriction, the fluid flow declines toward the sidewall at $y=0$, and thereby, displaces softer particles following the streamlines. Elastic particles always travel at the channel midplane ($z=0.5H$) being centred by the periodical constrictions. It is, therefore, the dynamic interplay between the viscous drag on particles and the forces due to particle elastic deformation that dictates the particle trajectories and enables separation of these compliant objects according to their mechanical stiffness.

One experimental device was made using replica molding technique also known as soft photolithography. First, photoresist (SU-8) was patterned on a silicon substrate using photolithography masks and standard photolithography techniques. Then a polymer, polydimethylsiloxane (PDMS), was injected into the mold, annealed to harden, and subsequently removed. Hence the negative of the patterned feature is transferred to the PDMS. A three dimensional model was constructed in SolidWorks. Values for ridge spacing and orientation were guided by the three dimensional simulations.

After the PDMS was cured, the final step was to seal the PDMS on a glass substrate to create micro-channels and to add inlet and outlet capillaries. For the first generation device, the periodic ridges were made on top surface only to improve the ease of microchannel fabrication and eliminate the need to align two independent PDMS layers with 1 um accuracy in x, y, and theta. Also, channels were created with three inputs so that the particles could be confined in a well developed sheath flow.

One problem encountered during flow experiments was the non-specific adhesion which could result in blocking of the channel. To solve this problem silanized polyethylene glycol (PEG) was grafted onto the glass substrate. Pegylation of the glass surface has significantly reduced non-specific adhesion.

This research could benefit society by building a high-throughput microfluidic sorting device that separates cells by their mechanical stiffness. As many cancer cells exhibit striking variations in their mechanical stiffness, successful execution of this device could result in an important enabling technology to help solve the problem of finding the malignant cell needle within the healthy tissue haystack, which may improve the early diagnosis of cancer.

One embodiment is a method for sorting microscale capsules, particles, and biological cells by their size using a continuous fluid flow through a novel microfluidic device. In this embodiment, the microfluidic device consists of a channel displaying an array of diagonal ridges on two opposing faces of the channel that are inclined at a well defined angle in-plane. Fluid flow through the channel and around the ridges causes forces which can sort and separate particles of different sizes in a high-throughput manner. The particles are propelled by an imposed viscous flow in a microchannel. The opposite walls of the microchannel are decorated with an array of diagonal ridges that lie in registry or with a well-defined offset. The ridges modify fluid flow and thereby contribute to modulation of particle flow in the direction perpendicular to the average flow direction. The magnitude of perpendicular motion of the particle is directly related to the particle size, whereby larger particles exhibit a greater magnitude of motion perpendicular to the average fluid flow. An important aspect of this embodiment is the diagonal orientation of the ridges that introduces asymmetry into the flow and particle motion. The magnitude of the lateral displacement is related to the size of the particles. Hence, the device can be used to separate particles by size in a parallel and high-throughput manner.

The phenomenon of separation lies in that particles of different sizes experience variation in flow dynamics. In a laminar flow, the motion of the particles conforms to streamlines. However, when the particles encounter a narrow constriction at an angle, large particles have a greater propensity to move perpendicular to the ridges than smaller particles. Hence, an array of diagonal ridges imparts divergence of particles having different sizes.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of sorting a plurality of particles according to particle type, comprising the steps of:
   a. suspending the plurality of particles in a fluid, thereby creating a particle suspension; and
   b. moving the particle suspension in a direction of a fluid flow axis through two parallel walls that define a passage therebetween and from each of which a plurality of parallel spaced apart ridges extend, wherein the plurality of parallel spaced apart ridges are disposed along a direction that is diagonal to the fluid flow axis so that particles of a first type will tend to move in a first direction that is parallel to the ridge and diagonally away from the fluid flow axis and particles of a second type, different from the first type, will tend to move in a second direction that is different from the first direction.

2. A method of sorting a plurality of particles according to particle type, comprising the steps of:
   a. suspending the plurality of particles in a fluid, thereby creating a particle Suspension; and
   b. moving the particle suspension in a direction of a fluid flow axis through two parallel walls that define a passage therebetween and from each of which a plurality of parallel spaced apart ridges extend, wherein the plurality of parallel spaced apart ridges are disposed along a direction that is diagonal to the fluid flow axis so that particles of a first type will tend to move in a first direction that is diagonally away from the fluid flow axis and particles of a second type, different from the first type, will tend to move in a second direction that is different from the first direction, wherein the particles of the first type comprise stiff particles and wherein the particles of the second type comprise compliant particles.

3. The apparatus of claim 1, wherein the particles of the first type comprise particles having a first diameter and wherein the particles of the second type comprise particles having a second diameter that is less than the first diameter.

4. The apparatus of claim 1, wherein the particles of the first type comprise stiff particles and wherein the particles of the second type comprise compliant particles.

5. The apparatus of claim 2, wherein the particles of the first type comprise particles having a first diameter and wherein the particles of the second type comprise particles having a second diameter that is less than the first diameter.

* * * * *